United States Patent [19]

Kimura et al.

[11] Patent Number: 5,537,296
[45] Date of Patent: Jul. 16, 1996

[54] BACKLIGHT FOR LIQUID CRYSTAL DISPLAY AND LIQUID CRYSTAL DISPLAY

[76] Inventors: Yasuhiro Kimura, 904, Kamiwada, Yamato-shi, Kanagawa-ken; Mikio Kurihara, Azamino Koopo 1-103, 2-8-8, Azamino, Midori-ku, Yokohama-shi, Kanagawa-ken; Satoru Nishi, 5-1-2-308, Higashihara, Zama-shi, Kanagawa-ken; Masaya Yamaguchi, 3-7-4-1301, Azumabashi, Sumida-ku, Tokyo-to, all of Japan

[21] Appl. No.: 335,561

[22] Filed: Nov. 7, 1994

[30] Foreign Application Priority Data

Nov. 5, 1993 [JP] Japan ................................ 5-276633

[51] Int. Cl.⁶ ........................................... F21V 8/00
[52] U.S. Cl. ...................... 362/31; 362/26; 362/226
[58] Field of Search ................................ 362/32, 2, 27, 362/30, 226, 98, 99, 374, 375, 382, 376, 377; 359/48, 49, 50

[56] References Cited

U.S. PATENT DOCUMENTS

| | | | |
|---|---|---|---|
| 2,838,865 | 6/9158 | Hardesty | 362/31 X |
| 4,751,615 | 6/1988 | Abrams | 362/31 |
| 4,841,455 | 6/1989 | Leberl et al. | 362/31 X |
| 5,184,888 | 2/1993 | Skuma et al. | 362/31 X |
| 5,381,309 | 1/1995 | Borchardt | 362/30 X |

Primary Examiner—Denise L. Gromada
Assistant Examiner—Thomas M. Sember
Attorney, Agent, or Firm—Ronald L. Drumheller

[57] ABSTRACT

A lamp guarding unit 26 of a backlight 20 for a liquid crystal display is detachable from a lamp holding unit 24 fixed to a light-guiding plate 22 in a direction perpendicular to a light illumination surface of the light-guiding plate 22. Therefore, in replacing a fluorescent tube 44, it is not necessary to replace the whole backlight 20 or for the user to touch the fluorescent tube 44, which is difficult to handle. Because of the perpendicular removal, only a small space is needed for the replacement. Thus, the fluorescent tube 44 can be replaced safely and easily, and only a small space is required for this replacement.

2 Claims, 11 Drawing Sheets

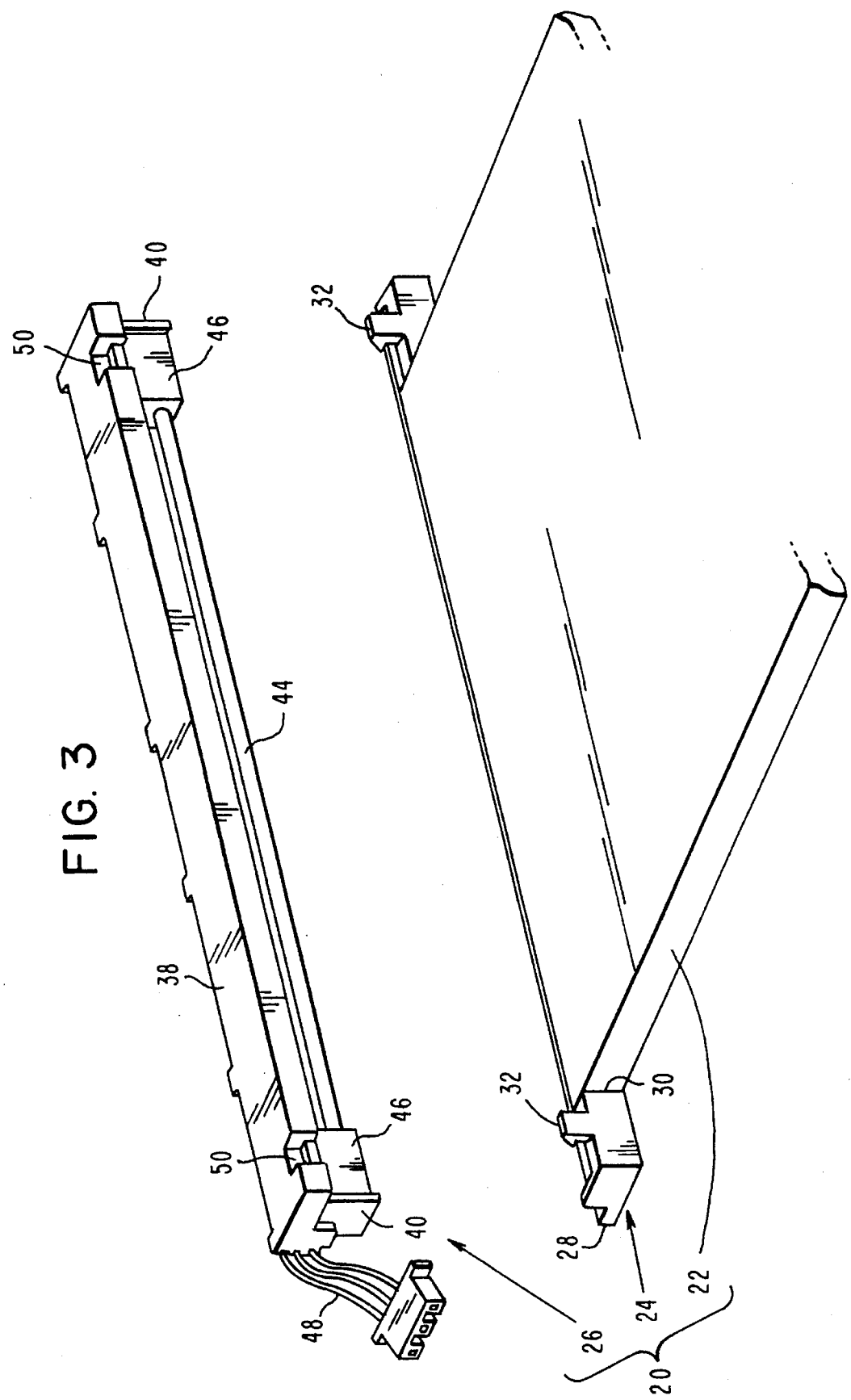

BACKLIGHT FOR LIQUID CRYSTAL DISPLAY AND LIQUID CRYSTAL DISPLAY

BACKGROUND OF THE INVENTION

1. Field of the Invention

The present invention relates to a backlight for a liquid crystal display which illuminates a liquid crystal cell by light emitted from a light source through a light-guiding plate, and to a liquid crystal display incorporating such a backlight.

2. Related Art

Among known backlights for a liquid crystal display in which light emitted from a light source (a fluorescent lamp such as a cold-cathode tube and a hot-cathode tube) is guided through a light-guiding plate and used for illumination, there is what is called a side lamp type backlight. Side lamp type backlights can be further classified as a reflection film type, in which light emitted from a light source is reflected by a reflection film and then introduced into a light-guiding plate, and a reflection plate type, in which light emitted from a light source is reflected by a reflection plate such as an aluminum plate and then introduced into a light-guiding plate. In both types, the light source, reflection film, etc. are attached to an end portion of the light-guiding plate.

In the above types of backlight, the light source (lamp) naturally needs to be replaced when it burns out (or reaches the end of its lifetime).

In such a case, it may be conceivable to replace the whole backlight as shown in FIG. 16. However, this method is wasteful and very costly because parts that need not be replaced are replaced together. Since a general liquid crystal display is wholly enclosed by a cover together with a backlight, the cover needs to be removed to replace the whole backlight, a cumbersome job. Furthermore, in replacing the whole backlight unit, dust is likely to be introduced between the liquid crystal cell and the light-guiding plate, causing some problems.

As shown in FIG. 16, there has been proposed a backlight for a liquid crystal display 80 in which a light source, a connector, a holder for holding those, and other parts constitute a single unit. It may be conceivable to replace this whole backlight unit 82. However, even in this case, parts that need not be replaced are replaced together. Therefore, this method is still wasteful and costly. Furthermore, the backlight unit 82 having the above configuration can be removed only in the direction along the light illumination surface (display surface of the liquid crystal cell) of the light-guiding plate 84, so it is necessary to provide a large space (a space along the direction of removing the backlight unit 82) for the purpose of removal. However, liquid crystal displays in which the density is being increased have no space margin. Furthermore, as above, a large opening is required for backlight replacement.

On the other hand, with the above configuration, the operation of replacing a single light source is dangerous for the ordinary user because the fluorescent tube itself is thin and easily broken. Furthermore, in the case of the reflection film type backlight, it is difficult for the ordinary user to replace the fluorescent tube singly, because attachment of the reflection plate as required in association with the fluorescent tube replacement requires a very special technique.

SUMMARY OF THE INVENTION

In view of the above facts, an object of the present invention is to provide a low-cost backlight for a liquid crystal display which enables safe and easy replacement of a light source while requiring only a small space, and a liquid crystal display incorporating such a backlight.

According to the invention, a backlight is provided for a liquid crystal display which illuminates a liquid crystal cell with light emitted from a light source and guided by a light-guiding plate and comprises a lamp holding unit assuming a partially opened box shape and fixed to the light-guiding plate; and a lamp guarding unit incorporating the light source, being detachable from the lamp holding unit in a direction approximately perpendicular to a light illumination surface of the light-guiding plate, and covering the incorporated light source together with the lamp holding unit in a state in which the lamp guarding unit is attached to the lamp holding unit.

According to the invention, a liquid crystal display is provided which performs display by illuminating a liquid crystal cell with light emitted from a light source and guided by a light-guiding plate and includes a lamp holding unit assuming a partially opened box shape and fixed to the light-guiding plate; and a lamp guarding unit incorporating the light source, being detachable from the lamp holding unit in a direction approximately perpendicular to the display surface of the liquid crystal cell, and covering the incorporated light source together with the lamp holding unit in a state in which the lamp guarding unit is attached to the lamp holding unit.

In the backlight for a liquid crystal display, the lamp guarding unit incorporating the light source is attached to the lamp holding unit that is fixed to the light-guiding plate, and covers the light source together with the lamp holding unit. Light emitted from the light source illuminates a liquid crystal cell through the light- guiding plate.

Since the lamp guarding unit incorporating the light source is detachable from the lamp holding unit, the lamp guarding unit alone can be separated for replacement from the light-guiding plate and the lamp holding unit in a direction perpendicular to the light guiding plate. Therefore, the light source can be replaced without replacing the whole backlight; that is, parts that need not be replaced are not replaced together as in the conventional case. Thus, the light source replacement is not wasteful and is very low in cost.

Even when the liquid crystal display using this backlight is wholly enclosed, together with the backlight, by a cover, there is no need to provide a large opening for backlight replacement in the cover. Therefore, the reduction of the cover strength can be minimized because it is sufficient to replace only the lamp guarding unit (that is, it is not necessary to replace the whole backlight) and because the removing direction of the lamp guarding unit is perpendicular to the light-guiding plate. Since the light-guiding plate need not be replaced, dust is not introduced between the liquid crystal cell and the light-guiding plate. Furthermore, since the lamp guarding unit incorporating the light source is detachable from the lamp holding unit in a direction approximately perpendicular to the light illumination surface of the light-guiding plate, the space (along the removing direction) necessary for the removing operation can be minimized.

Furthermore, since the invention does not employ a configuration in which only the light source is replaced singly, the ordinary user is not required to handle the fluorescent tube itself. Therefore, for example, even when the light source is a fluorescent tube that is thin and easily damaged, the light source replacing operation is safe and easy.

As described above, in the backlight for a liquid crystal display according to the invention, the light source can be replaced safely and easily, a minimum of space is required for the replacement, and cost reduction can be attained.

In the liquid crystal display in accordance with the invention, the lamp guarding unit incorporating the light source is attached to the lamp holding unit that is fixed to the light-guiding plate and covers the light source together with the lamp holding unit. Light emitted from the light source illuminates the liquid crystal cell through the light-guiding plate.

Since the lamp guarding unit incorporating the light source is detachable from the lamp holding unit in the perpendicular direction, the lamp guarding unit alone can be separated for replacement from the light-guiding plate and the lamp holding unit. Therefore, the light source can be replaced without wholly replacing the light-guiding plate and the lamp holding unit; that is, parts that need not be replaced are not replaced together as in the conventional case. Thus, the light source replacement is not wasteful and is very low in cost.

Even when this liquid crystal display is wholly enclosed by a cover, there is no need to provide a large opening for backlight replacement in the cover. Therefore, the reduction of the cover strength, for instance, is small because the light source can be replaced by replacing only the lamp guarding unit in the perpendicular direction. Since the light-guiding plate need not be replaced, dust is not introduced between the liquid crystal cell and the light-guiding plate. Furthermore, since the lamp guarding unit incorporating the light source is detachable from the lamp holding unit in a direction perpendicular and opposite to the display surface of the liquid crystal cell, the space (along the removing direction) necessary for the removing operation can be minimized.

Furthermore, since the invention does not employ a configuration in which only the light source is replaced singly, the ordinary user is not required to handle the fluorescent tube itself. Therefore, for example, even when the light source is a fluorescent tube that is thin and easily damaged, the light source replacing operation is safe and easy.

BRIEF DESCRIPTION OF THE DRAWINGS

FIG. 3 is a perspective view showing the appearance of the main part of the backlight according to an embodiment of the invention, that is, a state in which the lamp guarding unit is separated from the lamp holding unit;

DESCRIPTION OF THE PREFERRED EMBODIMENTS

As described above, in the liquid crystal display according to the invention, the light source can be replaced safely and easily, only a small space is required for the replacement, and cost reduction is attained.

An embodiment of the present invention will be described with reference to FIGS. 1 to 10.

Figure 8:
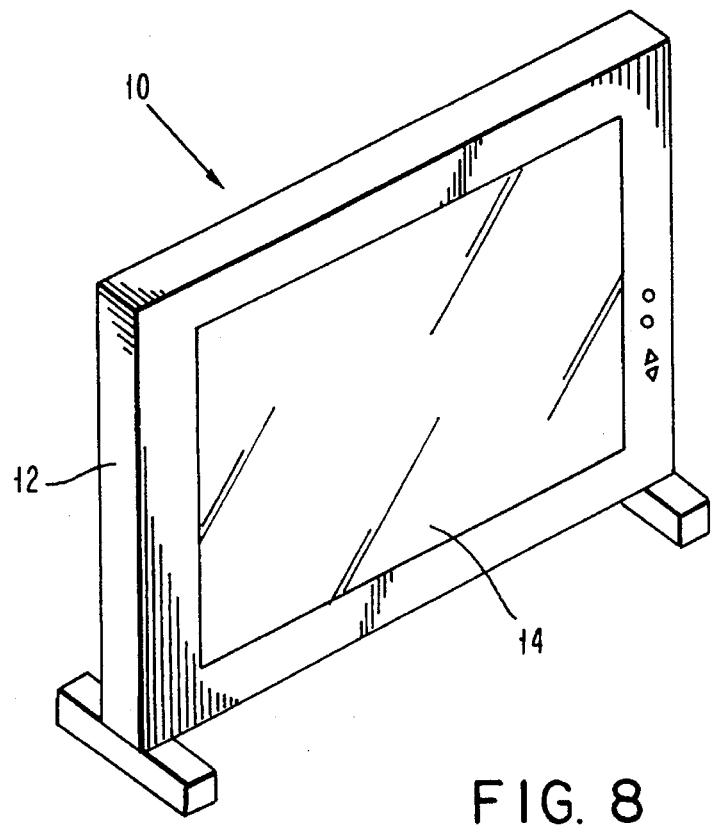
FIG. 8 is a perspective view showing an appearance, as viewed from the front, of a liquid crystal display according to an embodiment of the invention.
Figure 9:
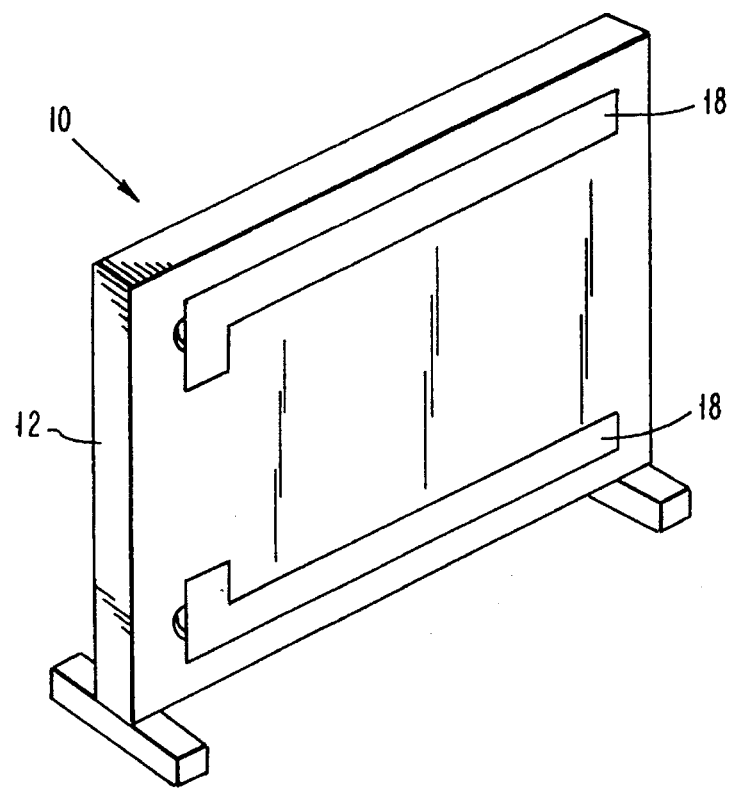
FIG. 9 is a perspective view showing an appearance, as viewed from the back, of the liquid crystal display shown in FIG. 8.
Figure 10:
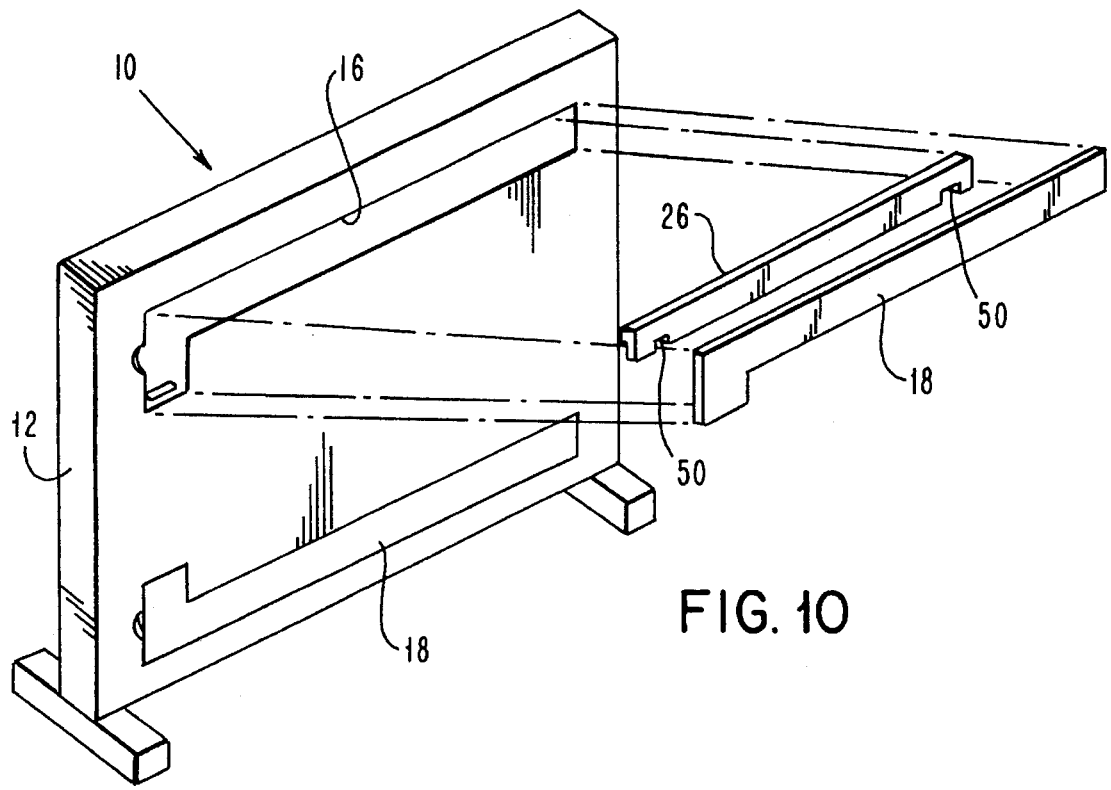
FIG. 10 is a perspective view showing a state in which a lid and the lamp guarding unit are removed from the liquid crystal display shown in FIG. 9.

FIG. 8 is a perspective view showing the appearance, as viewed from the front, of a liquid crystal display 10 according to the embodiment of the invention. FIGS. 9 and 10 are perspective views showing appearances, as viewed from the back, of the liquid crystal display 10.

The liquid crystal display 10 has a cover (main body) 12 and assumes, as a whole, a thin box shape. A liquid crystal display panel (liquid crystal cell) 14 and a backlight 20 (see FIG. 1) for a liquid crystal display are incorporated in the cover 12. The display panel 14 is exposed through a front opening of the cover 12, and displays characters and so on when illuminated with light supplied from the backlight 20. Paired top and bottom openings 16 of, for instance, an L shape are formed in the back surface of the cover 12 at positions each corresponding to a lamp holding unit 24 and a lamp guarding unit 26 of the backlight 20, and lids 18 are detachably attached to the respective openings 16. The inside of the cover 12 can be exposed through the opening 16 by removing the lid 18.

Figure 1:
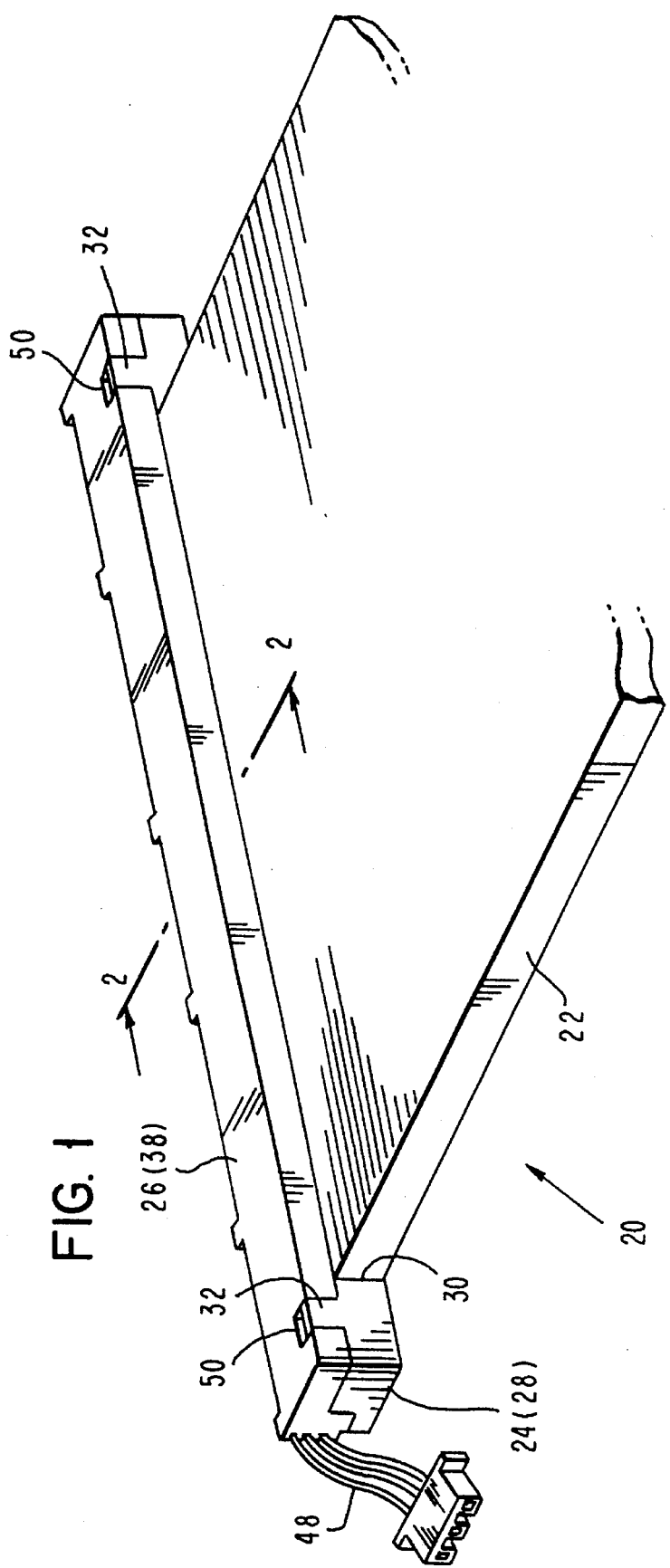
FIG. 1 is a perspective view showing the appearance of the main part of a backlight according to an embodiment of the present invention, that is, a state in which a lamp guarding unit is attached to a lamp holding unit.
Figure 2:
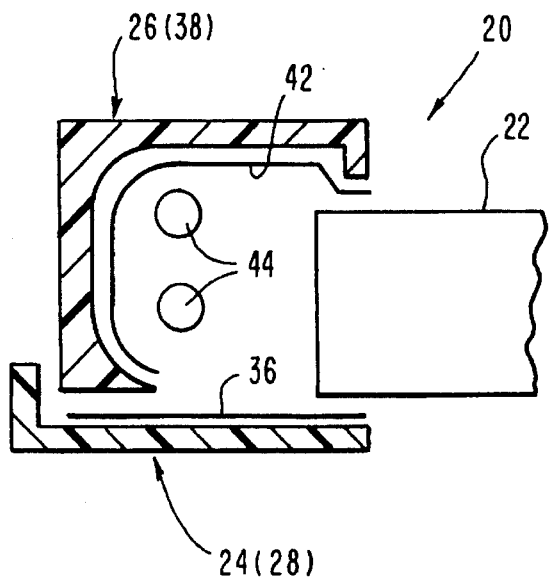
FIG. 2 is a sectional view taken along line 2—2 in FIG. 1, and shows a configuration of the main part of the backlight according to an embodiment of the invention, that is, the state in which the lamp guarding unit is attached to the lamp holding unit.

FIGS. 1 and 3 are perspective views showing the appearance of the main part of the backlight 20, and FIG. 2 is a sectional view showing a structure of the main part of the backlight 20.

The backlight 20 has a light-guiding plate 22, a lamp holding unit 24 and a lamp guarding unit 26.

The light-guiding plate 22 is a thin plate made of, for instance, an acrylic resin, and coextends with and adjoins the back surface of the display panel 14. The lamp holding units 24 and the lamp guarding units 26, which have basically the same structure, are attached to respective end portions of the light-guiding plate 22. The lamp holding unit 24 and the lamp guarding unit 26 are described below in detail.

Figure 4:
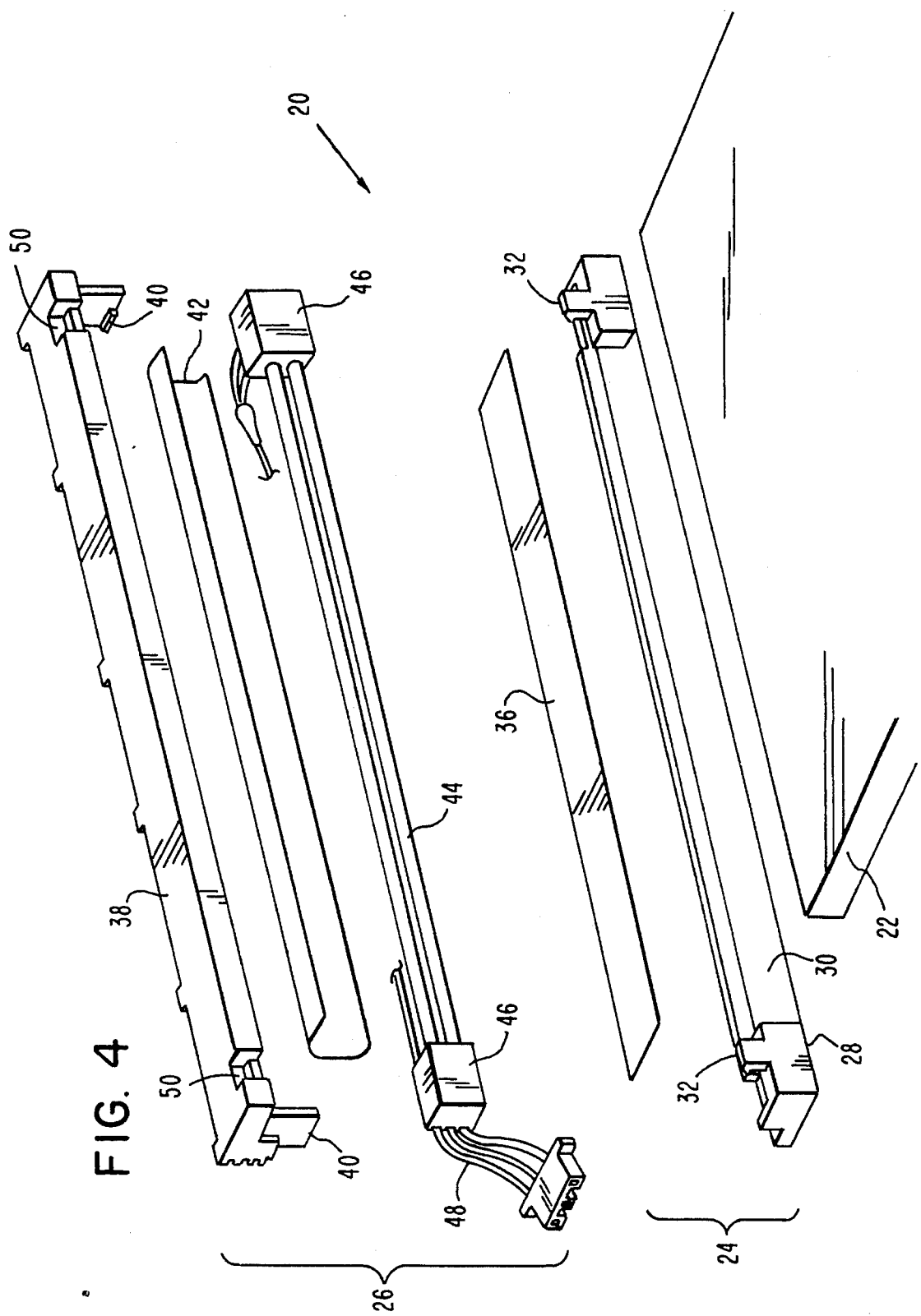
FIG. 4 is a broken perspective view of the lamp guarding unit and the lamp holding unit, and shows the configuration of the main part of the backlight according to an embodiment of the invention.
Figure 5:
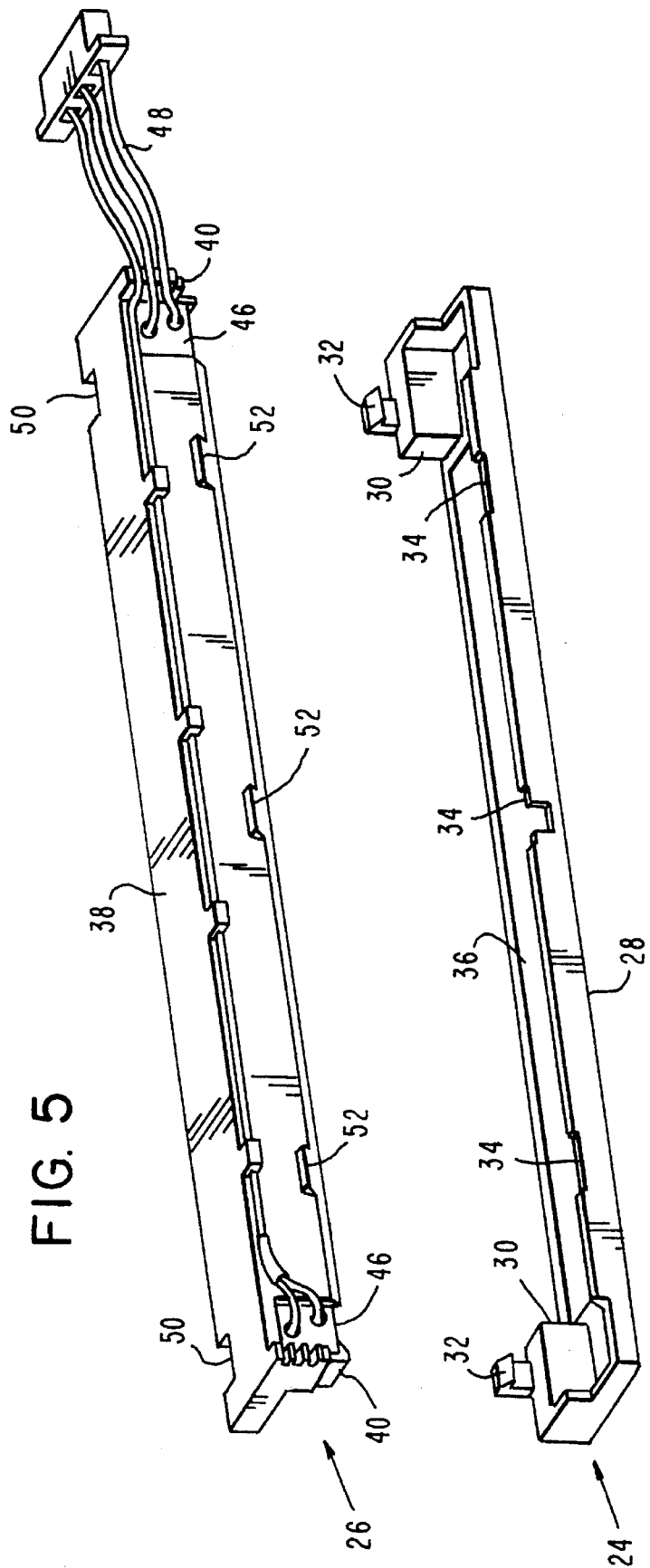
FIG. 5 is a perspective view, as viewed from the back, of the lamp guarding unit and the lamp holding unit shown in FIG. 3.

As shown in FIGS. 4 and 5 in detail, the lamp holding unit 24 has a bottom holder 28. The bottom holder 28 is made of resin, assumes a long and narrow gutter shape, and has a fitting portion 30 that conforms to the end portion of the light-guiding plate 22. The end portion of the light-guiding plate 22 is fitted into the fitting portion 30, and they are united to each other with, for instance, screws or a double-sided adhesive tape. The bottom holder 28 has a pair of engaging claws 32 in the vicinity of both end portions in its longitudinal direction and on the side of the light-guiding plate 22, which claws project upward in FIG. 1, that is, in the direction perpendicular to the light illumination surface (display surface of the display panel 14) of the light-guiding plate 22. The engaging claw 32 has a wedge-shaped tip portion which can fit into a fitting groove 50 (described later in detail) of the lamp guarding unit 26 (top holder 38). As shown in FIG. 5 in detail, a plurality (three in this embodiment) of engaging grooves 34 are formed at predetermined intervals in the bottom holder 28 on its back so as to be engageable with respective engaging protrusions 52 of the lamp guarding unit 26 (top holder 38). Furthermore, a light reflective bottom reflection film 36 is bonded to a central portion (between the pair of engaging claws 32) of the bottom holder 28 by means of, for instance, double-sided adhesive tape.

Figure 6:
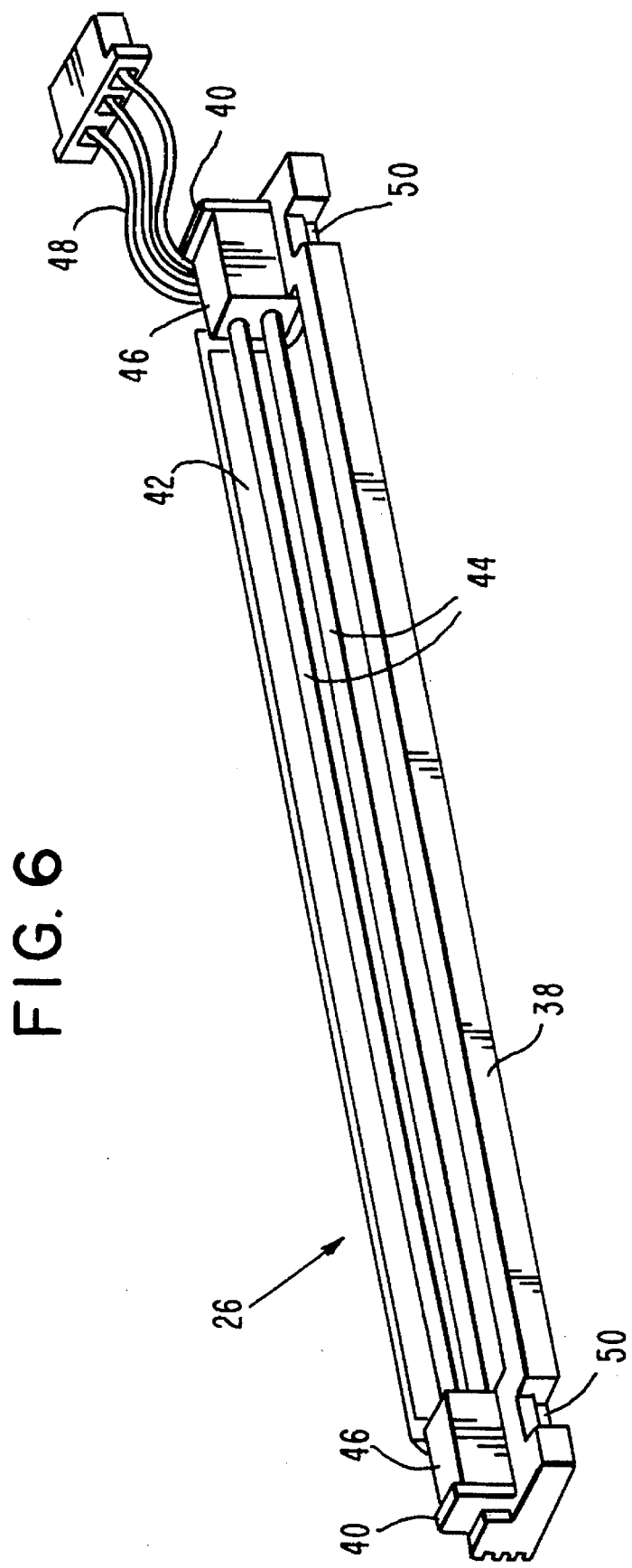
FIG. 6 is a perspective view, as viewed from the bottom, of the lamp guarding unit of the backlight according to an embodiment of the invention.
Figure 7:
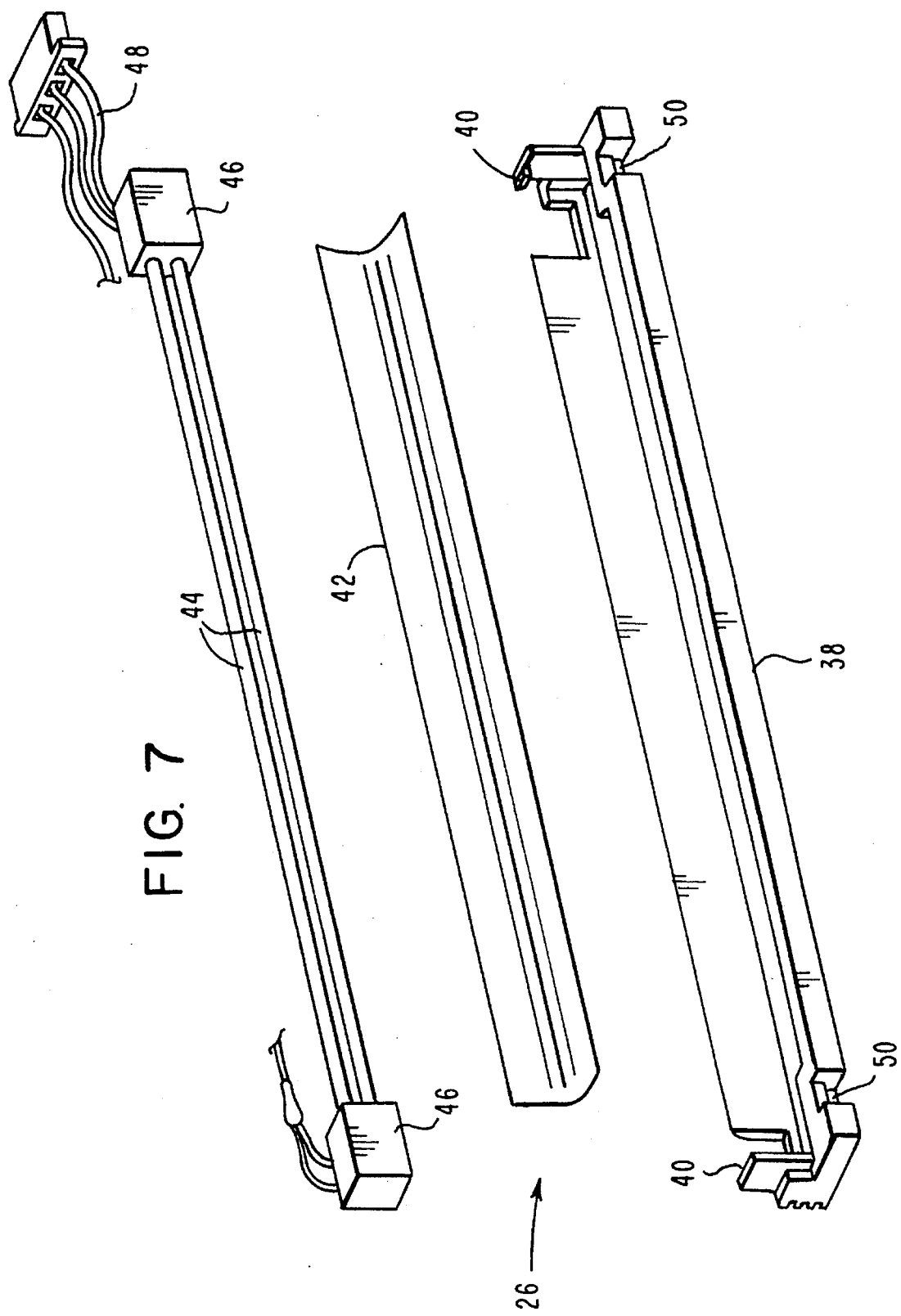
FIG. 7 is a broken perspective view of the lamp guarding unit shown in FIG. 6.

The lamp guarding unit 26 is attached to the lamp holding unit 24 having the above structure. As shown in FIGS. 4 to 7 in detail, the lamp guarding unit 26 has a top holder 38. Like the bottom holder 28 of the lamp holding unit 24, the top holder 38 of the lamp guarding unit 26 is made of resin, and assumes a long and narrow box shape whose bottom portion is opened corresponding to the bottom holder 28. The top holder 38 has a pair of holding claws 40 in both end portions in its longitudinal direction which claws project toward the lamp holding unit 24 (bottom holder 28). Having a wedge-shaped tip portion, the holding claws 40 can engage with respective lamp sockets 46 (described later). A central portion (between the pair of holding claws 40) of the top holder 38 is shaped in a circular arc, and a light reflective top reflection film 42 is bonded to the central portion by means of, for instance, double-sided adhesive tape, as in the case of the bottom holder 28 of the lamp holding unit 24. A fluorescent tube 44 as a light source is accommodated in the top holder 38. The lamp sockets 46 are attached to both end portions in the longitudinal direction of the fluorescent tube 44. As shown in FIG. 6, the holding claws 40 engage with the respective lamp sockets 46 so that the lamp sockets 46 are held by and united to the top holder 38 and the fluorescent tube 44 is accommodated in the top holder 38.

Connector cables 48 that are electrically connected to the fluorescent tube 44 are led out from the one lamp socket 46 that holds the fluorescent tube 44, and connected to a power supply (not shown) provided in the cover 12.

Furthermore, a pair of fitting grooves 50 is formed in the top holder 38 of the lamp guarding unit 26 in the vicinity of the respective paired holding claws 40. The pair of fitting grooves 50 corresponds to the respective paired engaging claws 32 of the bottom holder 28 of the lamp holding unit 24, and the engaging claws 32 fit the fitting grooves 50. A plurality (three in this embodiment) of engaging protrusions 52 are formed in the top holder 38 of the lamp guarding unit 26 on its back so as to correspond to and be engageable with the respective engaging grooves 34. That is, the engaging claws 32 are fitted to the fitting grooves 50 and the engaging protrusions 52 are engaged with the engaging grooves 34 to unite the lamp guarding unit 26 to the lamp holding unit 24. Furthermore, by releasing the engagement at these portions, the lamp guarding unit 26 can be removed from the lamp holding unit 24 in the direction perpendicular to the light illumination surface (display surface of the display panel 14) of the light-guiding plate 22.

In the state in which the lamp guarding unit 26 is united to the lamp holding unit 24, the fluorescent tube 44 accommodated in the lamp guarding unit 26 is enclosed by the lamp holding unit 24 and the lamp guarding unit 26. As a result, light emitted from the fluorescent tube 44 is introduced to the light-guiding plate 22 directly or reflected by the top reflection film 42 and the bottom reflection film 36, and illuminates the display panel 14.

The operation of this embodiment is described below.

In the liquid crystal display 10 having the above configuration and the backlight 20 incorporated therein, the engaging claws 32 are fitted to the fitting grooves 50 and the engaging protrusions 52 are engaged with the engaging grooves 34 to attach the lamp guarding unit 26, incorporating the fluorescent tube 44, to the lamp holding unit 24 that is fixed to the light-guiding plate 22. In this state, the lamp guarding unit 26 and the lamp holding unit 24 together enclose the fluorescent tube 44 (as shown in FIGS. 1 and 2), and light emitted from the fluorescent tube 44 illuminates the display panel (liquid crystal cell) 14 through the light-guiding plate 22.

Since the lamp guarding unit 26, in which the fluorescent tube 44 is accommodated, is detachable from the lamp holding unit 24, the lamp guarding unit 26 alone can be replaced by separating it from the light-guiding plate 22 and the lamp holding unit 24 in the perpendicular direction. More specifically, after the lid 18 of the cover 12 is removed to make the opening 16 appear, the engaging claws 32 are somewhat deformed elastically so as to retreat from the fitting grooves 50, and the engaging protrusions 52 are disengaged from the engaging grooves 34 (the state shown in FIG. 3). As a result, the lamp guarding unit 26 is separated from the lamp holding unit 24 in the perpendicular direction; that is, as shown in FIG. 10, only the lamp guarding unit 26 can be removed from the liquid crystal display 10 in the perpendicular direction without shifting it, for instance, sideways.

Therefore, when for instance the fluorescent tube 44 has burnt out and needs to be replaced, it can be replaced without the need to replace the whole backlight 20. Thus, parts that need not be replaced are not replaced together, as was the conventional case, so that the fluorescent tube replacement is not wasteful and is very low in cost.

Even when the liquid crystal display 10 and the backlight 20 are wholly enclosed by the cover 12 as in this embodiment, the lamp guarding unit 26 alone can be replaced; that is, it is not necessary to replace the whole backlight 20. Therefore, the size of the opening 16 formed in the cover 12 can be minimized (there is no need to form a large opening for the backlight replacement in the cover 12), to minimize reduction of the strength of the cover 12. Furthermore, dust is not introduced between the liquid crystal display 10 and the light-guiding plate 22.

Since the lamp guarding unit 26, in which the fluorescent tube 44 is accommodated, can be detached from the lamp holding unit 24 in a direction perpendicular to the light illumination surface (display surface of the display panel 14) of the light-guiding plate 22, the lamp guarding unit 26 can be separated from the lamp holding unit 24 merely by a removing operation on the back surface of the cover 12, and the space (along the removing direction) required for the removing operation can be minimized.

Since the above embodiment does not employ a configuration in which only the fluorescent tube 44 is replaced singly, the ordinary user is not required to handle the fluorescent tube 44 itself. Therefore, for example, even when the fluorescent tube 44 is thin and easily damaged, the fluorescent tube replacing operation is safe and easy.

As described above, in the liquid crystal display 10 and the backlight 20 used therein according to the invention, the fluorescent tube 44 can be replaced safely and easily, only a small space is required for the replacement, and cost reduction can be attained.

Figure 11:
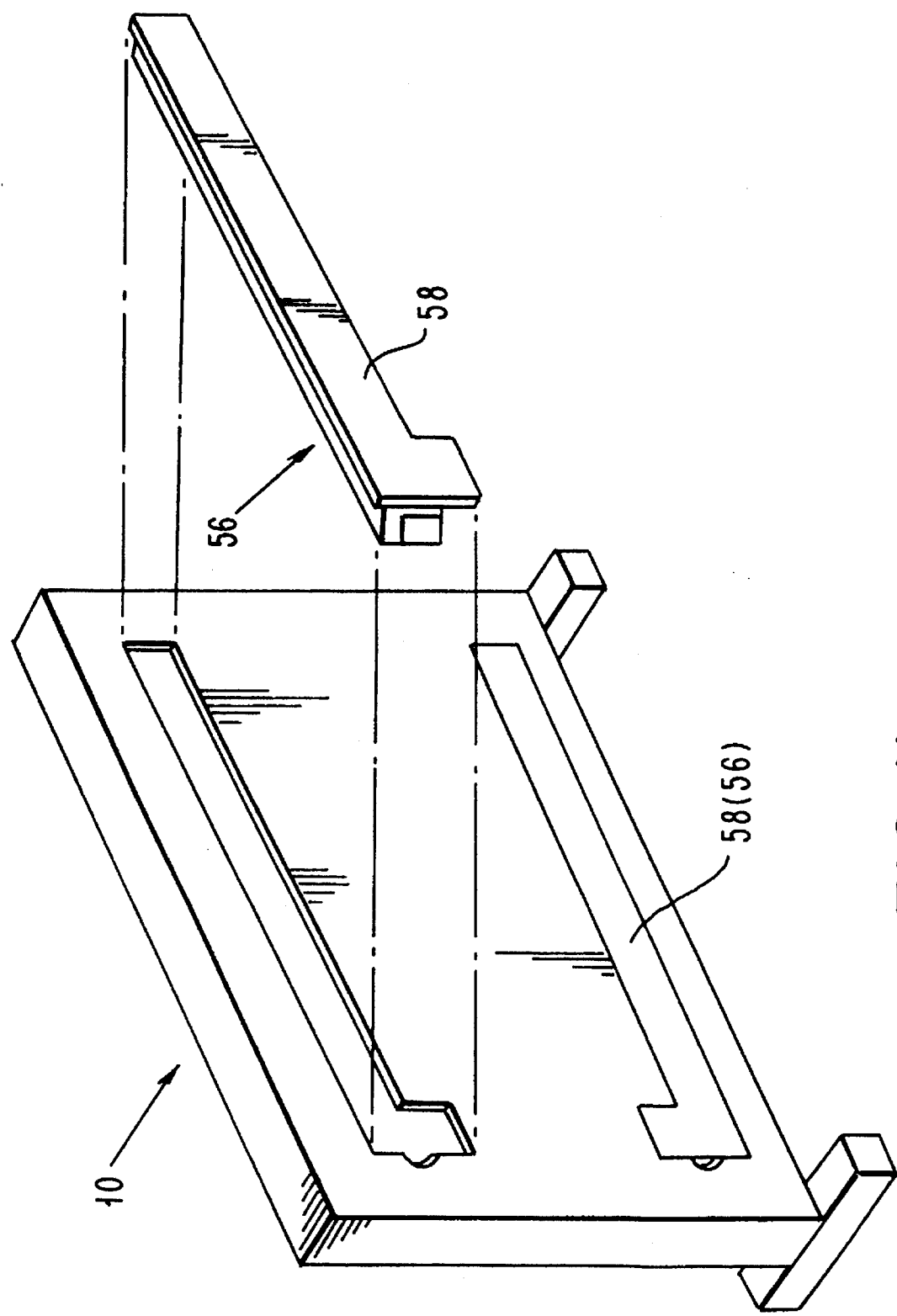
FIG. 11 is a perspective view, as viewed from the back, corresponding to FIG. 10 and showing a liquid crystal display according to another embodiment of the invention.
Figure 12:
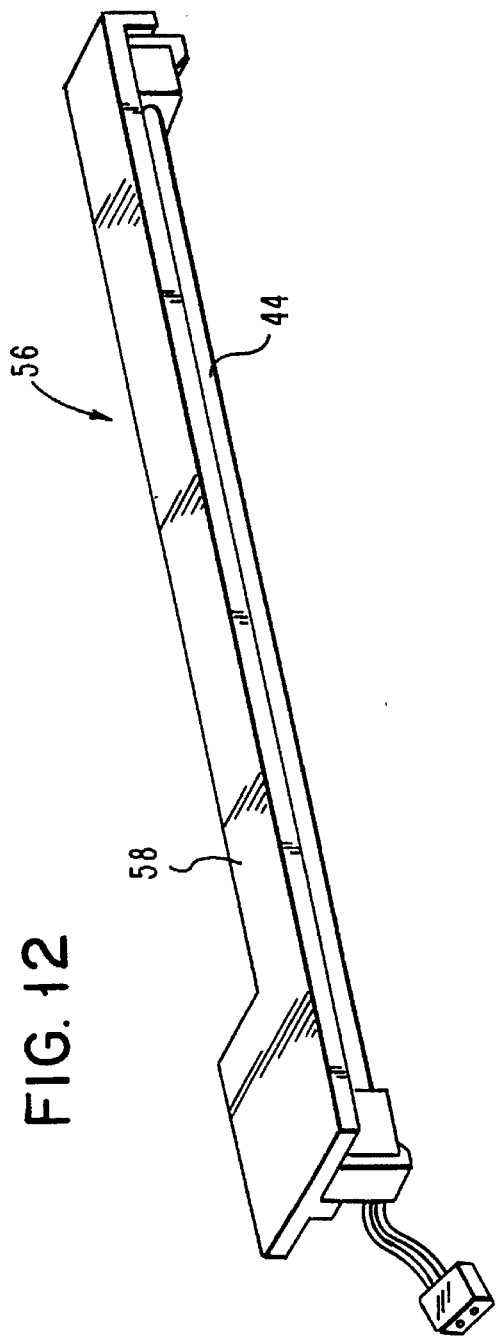
FIG. 12 is a perspective view of a lamp guarding unit of the liquid crystal display shown in FIG. 11.
Figure 13:
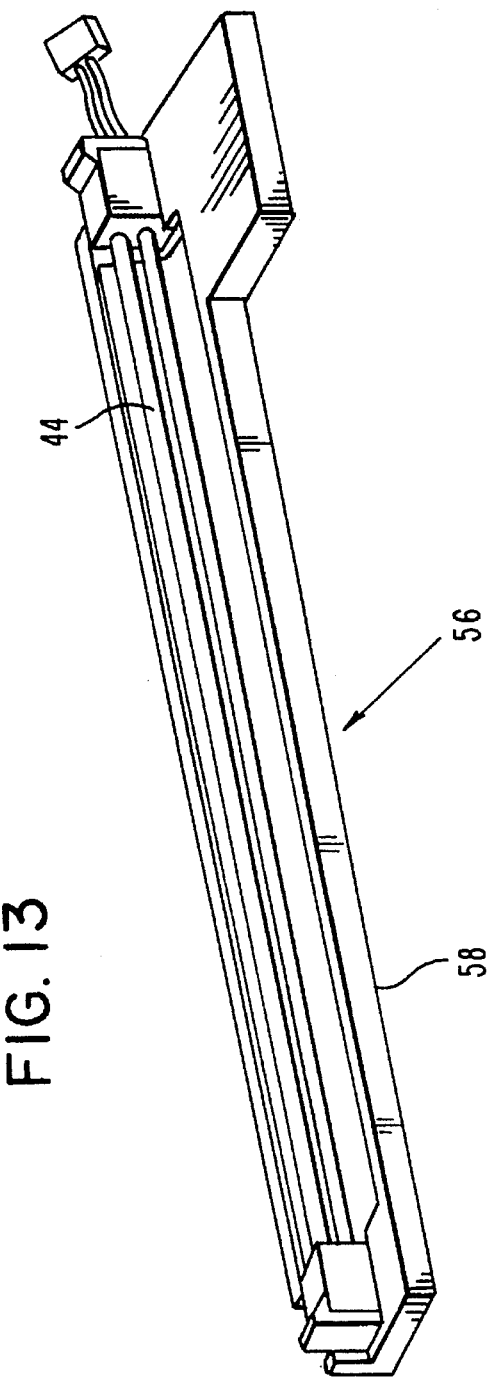
FIG. 13 is a perspective view, as viewed from the bottom, of the lamp guarding unit shown in FIG. 12.
Figure 16:
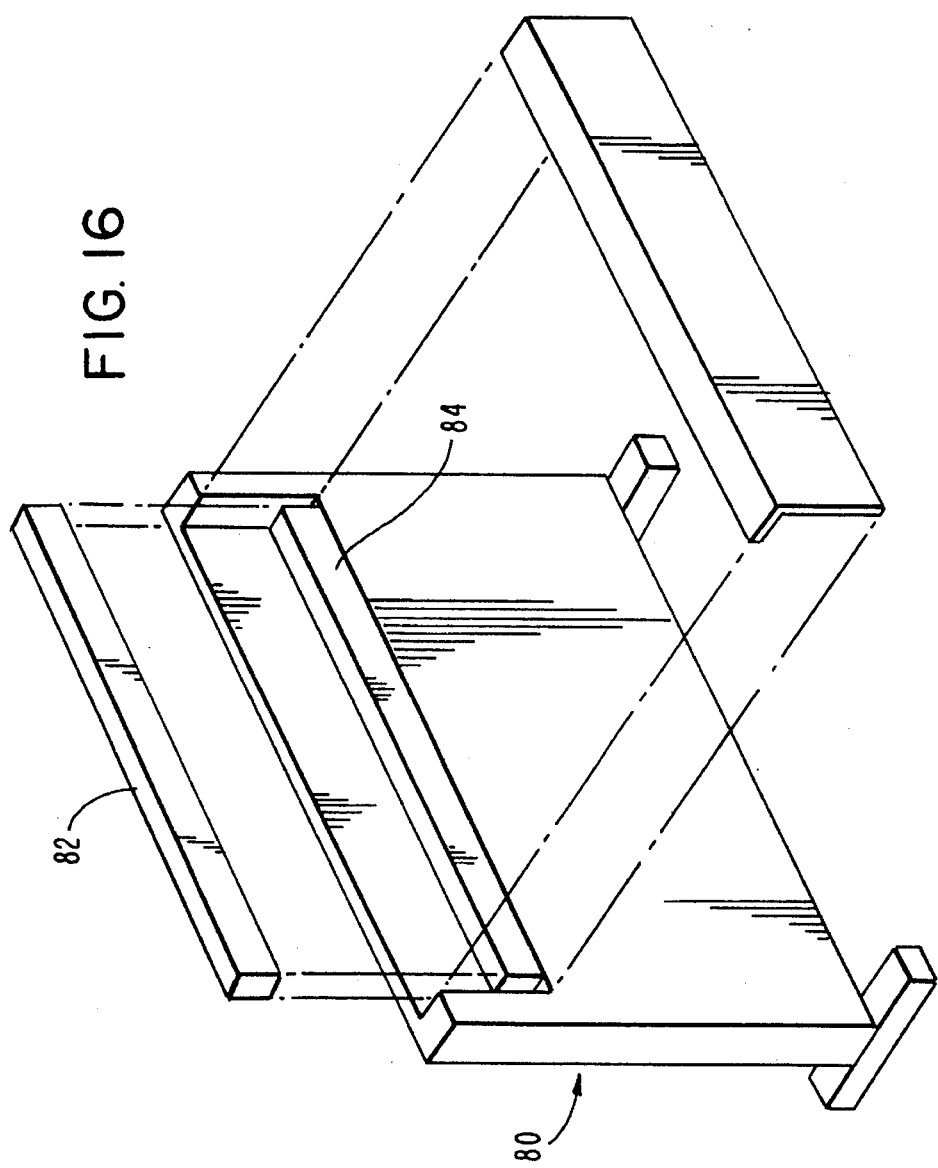
FIG. 16 is a perspective view corresponding to FIG. 10 and showing a conventional liquid crystal display and a backlight.

In the above embodiment, the lids 18 are detachably attached to the respective openings 16 formed in the cover 12 of the liquid crystal display 10, and the lamp guarding unit 26 of the backlight 20 is separated and removed from the lamp holding unit 24 after the lid 18 is removed. In other words, the lamp guarding unit 26 is completely independent of the cover 12 and the lid 18 of the liquid crystal display 10. However, the invention is not limited to this configuration, but a lamp guarding unit 56 may be united to a lid portion 58 as shown in FIGS. 11 to 13. That is, in the lamp guarding unit 56, the above-described top holder 38 and the lid 18 are united to each other.

The lamp guarding unit 56 can be replaced without the need to first remove the lid 18 of the liquid crystal display 10 as in the above embodiment. This configuration is effective because it makes the replacing operation easier.

Figure 14:
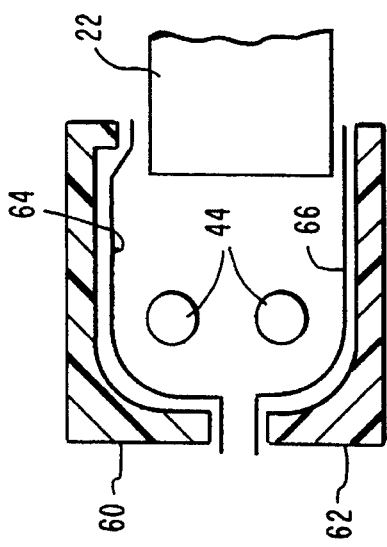
FIG. 14 is a sectional view corresponding to FIG. 2 and showing a configuration of a lamp guarding unit and a lamp holding unit according to another embodiment of the invention.
Figure 15:
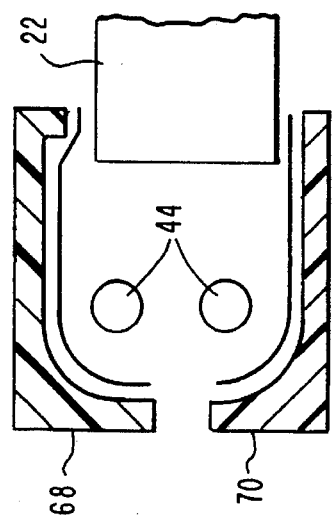
FIG. 15 is a sectional view corresponding to FIG. 2 and showing a configuration of a lamp guarding unit and a lamp holding unit according to another embodiment of the invention.

In the above embodiment, as shown in FIG. 2, the bottom holder 28 of the lamp holding unit 24 has a long and narrow gutter shape, and the top holder 38 of the lamp guarding unit 26 has a long and narrow box shape whose bottom portion is opened corresponding to the bottom holder 28. Furthermore, the bottom reflection film 36 and the top reflection film 42, shaped so as to conform to the bottom holder 28 and the top holder 38, are bonded to those holders. However, the shapes of the bottom holder 28 and the top holder 38 (in other words, the position at which the bottom reflection film 36 and the top reflection film 42 are separated) are not limited to the above, but may be designed as desired, as exemplified in FIGS. 14 and 15. In the example shown in FIG. 14, a top holder 60 and a bottom holder 62 have similar shapes, a top reflection film 64 and a bottom reflection film 66 are bonded to the respective holders in an identical manner, and end portions of the top reflection film 64 and the bottom reflection film 66 are pinched by the top holder 60 and the bottom holder 62. Furthermore, in the example shown in FIG. 15, a certain gap is provided between end portions of a top holder 68 and a bottom holder 70.

While in the above embodiment, the lamp holding unit 24 and the lamp guarding unit 26 (fluorescent tube 44) are respectively attached to the top and bottom end portions of the light-guiding plate 22, the invention is not limited to this configuration, but both of the lamp holding unit 24 and the lamp guarding unit 26 (fluorescent tube 44) may be attached to one of the top and bottom end portions of the light-guiding plate 22.

While the backlight 20 of the above embodiment is of the reflection film type in which light emitted from the fluorescent tube 44 is introduced to the light-guiding plate 22 after being reflected by the top reflection film 42 and the bottom reflection film 36, the invention is not limited to this configuration, but a reflection plate type may be employed in which light emitted from the light source (fluorescent tube 44) is introduced to the light-guiding plate 22 after being reflected by a reflection plate such as an aluminum plate.

Furthermore, while the above embodiment is directed to the case where the invention is applied only to the liquid crystal display 10, the invention may also be applied to, for instance, a laptop computer (notebook-type personal computer) or various other liquid crystal displays.

As described above, the invention provides advantages in that the light source can be replaced safely and easily, only a small space is required for the replacement, and cost reduction is attained.

We claim:

1. A backlight for a liquid crystal display which backlight illuminates a liquid crystal cell with light emitted from a light source and guided by a light-guiding plate, said backlight comprising:

a lamp holding unit assuming a partially opened box shape and being attached to the light-guiding plate; and a lamp guarding unit incorporating the light source, the lamp guarding unit being detachable from the lamp holding unit in a direction approximately perpendicular to the light illumination surface of the light-guiding plate, the light source being mounted upon and carried by the lamp guarding unit so that the light source is automatically separated from the lamp holding unit whenever the lamp guarding unit is detached from the lamp holding unit, the lamp guarding unit and the lamp holding unit together covering the light source when the lamp guiding unit is attached to the lamp holding unit.

2. A liquid crystal display which performs display by illuminating a liquid crystal cell with light emitted from a light source and guided by a light-guiding plate, said liquid crystal display comprising:

a lamp holding unit assuming a partially opened box shape and being attached to the light-guiding plate; and a lamp guarding unit incorporating the light source, the lamp guarding unit being detachable from the lamp holding unit in a direction approximately perpendicular to the display surface of the liquid crystal cell, the light source being mounted upon and carried by the lamp guarding unit so that the light source is automatically separated from the lamp holding unit whenever the lamp guarding unit is detached from the lamp holding unit, the lamp guarding unit and the lamp holding unit together covering the light source when the lamp guiding unit is attached to the lamp holding unit.

* * * * *